(12) United States Patent
Kawano

(10) Patent No.: US 7,694,220 B2
(45) Date of Patent: Apr. 6, 2010

(54) INFORMATION PROCESSOR, INFORMATION PROCESSING SYSTEM, FILE CONCURRENT EDITING METHOD AND FILE CONCURRENT EDITING PROGRAM

(75) Inventor: Kyoya Kawano, Yamatokoriyama (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 697 days.

(21) Appl. No.: 11/105,769

(22) Filed: Apr. 13, 2005

(65) Prior Publication Data

US 2005/0235216 A1    Oct. 20, 2005

(30) Foreign Application Priority Data

Apr. 14, 2004    (JP)    ............................. 2004-119546

(51) Int. Cl.
*G06F 17/00* (2006.01)
(52) U.S. Cl. ................. 715/243; 715/248; 715/272; 709/205; 709/227; 707/8; 707/203
(58) Field of Classification Search ............... 715/517, 715/522, 539, 530, 751, 753; 709/205, 227; 707/8, 203
See application file for complete search history.

(56) References Cited

U.S. PATENT DOCUMENTS

| 6,240,414 | B1 * | 5/2001 | Beizer et al. .................... 707/8 |
| 2002/0059272 | A1 * | 5/2002 | Porter .......................... 707/100 |
| 2002/0099775 | A1 * | 7/2002 | Gupta et al. ................. 709/205 |
| 2003/0105820 | A1 * | 6/2003 | Haims et al. ................. 709/205 |
| 2003/0179230 | A1 * | 9/2003 | Seidman ...................... 345/750 |
| 2003/0220905 | A1 * | 11/2003 | Amado et al. .................. 707/1 |
| 2004/0114258 | A1 * | 6/2004 | Harris et al. ................. 359/841 |
| 2005/0138554 | A1 * | 6/2005 | Bell et al. .................... 715/530 |
| 2005/0223336 | A1 * | 10/2005 | Plow et al. ................... 715/804 |

FOREIGN PATENT DOCUMENTS

| JP | 06-012310 | 1/1994 |
| JP | 2002-055972 | 2/2002 |
| JP | 2002-366476 | 12/2002 |

OTHER PUBLICATIONS

Chang, Bay-Wei, In-Place Editing of Web Pages: Sparrow Community-Shared Documents, Apr. 1998, World Wide Web Conference, WWW7, pp. 1-17.*
Groove Workspace: Software that connects your teams instnatly and securely, 2003, Groove.net, pp. 1 and 2.*

* cited by examiner

*Primary Examiner*—Nathan Hillery
(74) *Attorney, Agent, or Firm*—Edwards Angell Palmer & Dodge LLP

(57) ABSTRACT

The present invention provides an information processing system, an information processor, a file concurrent editing method and a file concurrent editing program each of which improves the efficiency of editing works, which are concurrently carried out with respect to a shared file, by displaying a sectional region(s) of the shared file with a display layout according to editing purpose or according to each user individually. A shared text information edit processing section (i) places sectional regions A and B of shared text information at corresponding positions of a display section according to a display layout of local layout information and (ii) causes the display section to display, at the corresponding positions of the display section, text contents "Text-A" and "Text-B" corresponding respectively to the sectional regions A and B of text management tables of the shared text information.

12 Claims, 13 Drawing Sheets

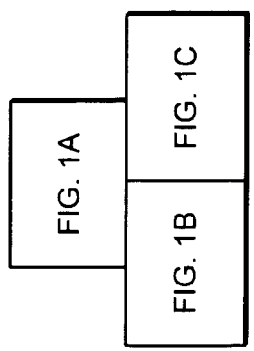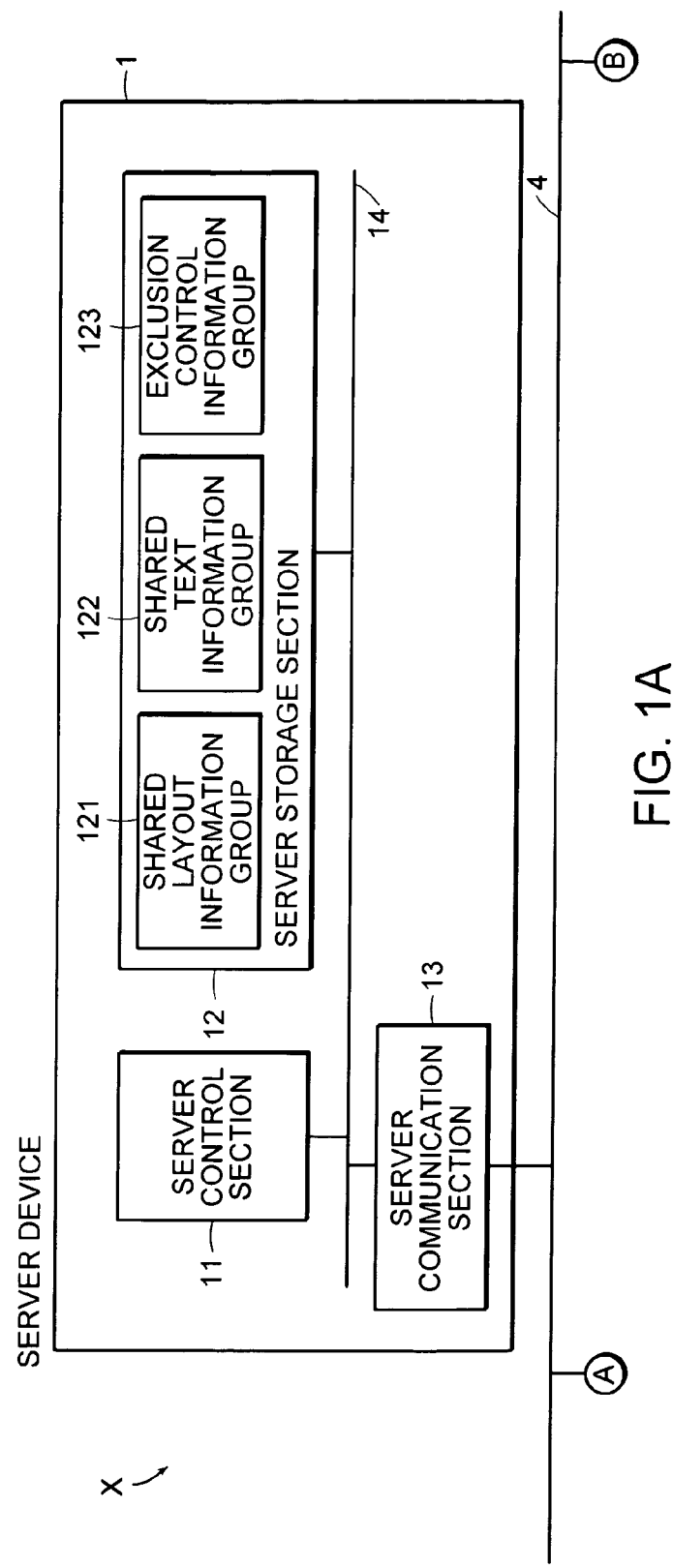

FIG. 9

| SHARED LAYOUT NUMBER | SHARED LAYOUT NAME |
|---|---|
| 1 | STANDARD |
| 2 | FOR EDITING BY USER a |

FIG. 10

| LOCAL LAYOUT NUMBER | SECTIONAL REGION NAME | REGION STARTING POSITION K | REGION STARTING POSITION J | REGION WIDTH I | REGION HEIGHT H |
|---|---|---|---|---|---|
| 1 | A | 10 | 50 | 20 | 25 |
| 1 | B | 10 | 15 | 50 | 25 |
| 1 | C | 40 | 50 | 20 | 25 |
| 2 | A | 10 | 15 | 50 | 25 |
| 2 | C | 10 | 50 | 50 | 25 |

INFORMATION PROCESSOR, INFORMATION PROCESSING SYSTEM, FILE CONCURRENT EDITING METHOD AND FILE CONCURRENT EDITING PROGRAM

This Nonprovisional application claims priority under 35 U.S.C. § 119(a) on Patent Application No. 2004/119546 filed in Japan on Apr. 14, 2004, the entire contents of which are hereby incorporated by reference.

FIELD OF THE INVENTION

The present invention relates to an information processor, an information processing system, a file concurrent editing method and a file concurrent editing program each of which allows a plurality of editing works to be done with respect to a shared file concurrently without affecting with each other, and especially relates to an information processor, an information processing system, a file concurrent editing method and a file concurrent editing program each of which improves the efficiency of the editing works.

BACKGROUND OF THE INVENTION

If a shared file is concurrently edited by a plurality of users and saved, there is a possibility that the shared file loses its consistency and is then damaged.

Conventionally, in the case of editing the shared file, exclusion control is carried out with respect to each shared file. That is, when the shared file is being used by a user, the other users cannot open or edit the shared file.

According to the exclusion control with respect to each shared file, when a user tries to open a shared file, whether or not the shared file is locked is checked first. In the case in which the shared file is not locked, the shared file is locked for the user and becomes openable and/or editable. In the case in which the shared file has already been locked by the other user, the user cannot open or edit the shared file.

It is easy to realize such exclusion control. However, in this case, it is impossible to concurrently edit one shared file. Therefore, the larger the shared file is, the worse the efficiency of the editing work becomes.

In order to solve this problem, Document 1 (Japanese Laid-Open Patent Publication No. 1994/12310 (Tokukaihei 6-12310, published on Jan. 21, 1994) discloses a technique for allowing concurrent editing of a shared file by carrying out the exclusion control that controls access to sectional regions of the shared file on a regional basis (i.e. controls the access to the sectional regions individually).

As illustrated in FIG. 8, when starting editing a sectional region 102a of a shared file 101, an information processing terminal 104a inquires an exclusion information processing section 105a about whether or not the editing can be carried out with respect to the sectional region 102a. The exclusion information processing section 105a looks up an exclusion control information 103 so as to check if the editing can be started or not. Initially, the editing is not carried out with respect to the sectional region 102a. Therefore, in the exclusion control information 103, the exclusion control information concerning the sectional region 102a is empty initially. This indicates that the editing can be started. The exclusion information processing section 105a informs the information processing terminal 104a that it is possible to start the editing. The information processing terminal 104a thus informed can start the editing with respect to the sectional region 102a. When the information processing terminal 104a has started editing the sectional region 102a, the exclusion information processing section 105a writes to the exclusion control information concerning the sectional region 102a in the exclusion control information 103 that the sectional region 102a is being edited.

In the case in which an information processing terminal 104b intends to start editing the sectional region 102a while the information processing terminal 104a is editing the sectional region 102a, an exclusion information processing section 105b looks up, in the same way as above, the exclusion control information concerning the sectional region 102a in the exclusion control information 103 to check if the editing can be carried out with respect to the sectional region 102a. In this case, unlike the above case, the exclusion information processing section 105b finds out that the sectional region 102a is being edited by the information processing terminal 104a. Therefore, the exclusion information processing section 105b informs the information processing terminal 104b that the editing of the sectional region 102a is prohibited. On this account, the information processing terminal 104b thus informed cannot start editing the sectional region 102a.

In the case in which the information processing terminal 104b starts editing a sectional region 102b of the shared file 101, the above-described process is carried out in a similar way. In this case, the information processing terminal 104b can start editing the sectional region 102b.

Thus, by carrying out the exclusion control with respect to the sectional regions (102a, 102b, . . . ) of the shared file 101 on the regional basis, it becomes possible to concurrently edit the shared file without losing its consistency. Here, in the case in which the shared file 101 has a relevant sectional region logically relevant to or integrated with the sectional region (102a, 102b, . . . ) to which the editing is carried, the technique is so arranged that the exclusion control can be carried out with respect to the relevant sectional region in the same way as above.

However, in the above arrangement, in the case in which the shared file 101 is edited by a plurality of users, all the contents in the shared file 101 are displayed for all the users with a common display layout peculiar to the shared file 101. However, such common display layout may not be easy to use or look at for the respective users. Therefore, each user starts editing after consuming some time to find out, from all the contents of the shared file 101 of such common display layout, a sectional region (for example, the sectional region 102a) where the user wishes to edit. Moreover, in the case in which the user refers to the relevant sectional region during the editing, it is necessary to look for the relevant sectional region in the same way as above. On this account, the editing becomes inefficient. Furthermore, the larger the shared file 101 is, the more serious these problems become.

SUMMARY OF THE INVENTION

The present invention was made to solve the above problems, and an object of the present invention is to provide an information processing system, an information processor, a file concurrent editing method and a file concurrent editing program each of which allows to display the sectional region(s) of the shared file with the display layout according to editing purpose or according to each user individually, thereby improving the efficiency of the editing works concurrently carried out with respect to the shared file.

In order to achieve the object, an information processing system of the present invention includes: (i) a first information processing terminal including (a) a storage section for storing a shared file having a plurality of sectional regions and (b) an exclusion control processing section for managing access to the sectional regions in the shared file so as to carry out exclusion control with respect to the sectional regions on a regional basis, in order to allow concurrent editing of the shared file; and (ii) at least one second information processing terminal (a) connected to the first information processing terminal communicably and (b) including a display layout control section for controlling a display section so as to cause the display section to display the shared file with a predetermined display layout, the display layout control section causing the display section to display the sectional regions according to a display layout determined in advance and selected for the at least one second information processing terminal individually.

According to the present invention, the display layout control section causes the display section to display the sectional region(s) according to the display layout determined in advance for each second information processing terminal or each display section, or, in the step of controlling the display layouts, the display section displays the sectional region(s) according to the display layout determined in advance for each second information processing terminal or each display section.

On this account, it is possible to edit the sectional region with the display of an appropriate display layout determined in advance according to editing purpose or according to each user individually. On this account, it is possible to improve the operability and the efficiency of the editing works concurrently carried out with respect to the shared file.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 9 is a diagram illustrating one of shared layout information.

FIG. 10 is a diagram illustrating one of the local layout information.

DESCRIPTION OF THE EMBODIMENTS

The following explains the embodiments of the present invention in reference to the accompanying figures, so as to serve the understanding of the present invention. The embodiments below are to exemplify the present invention, but not to limit the technical scope of the present invention.

Embodiment 1

Figure 1B:
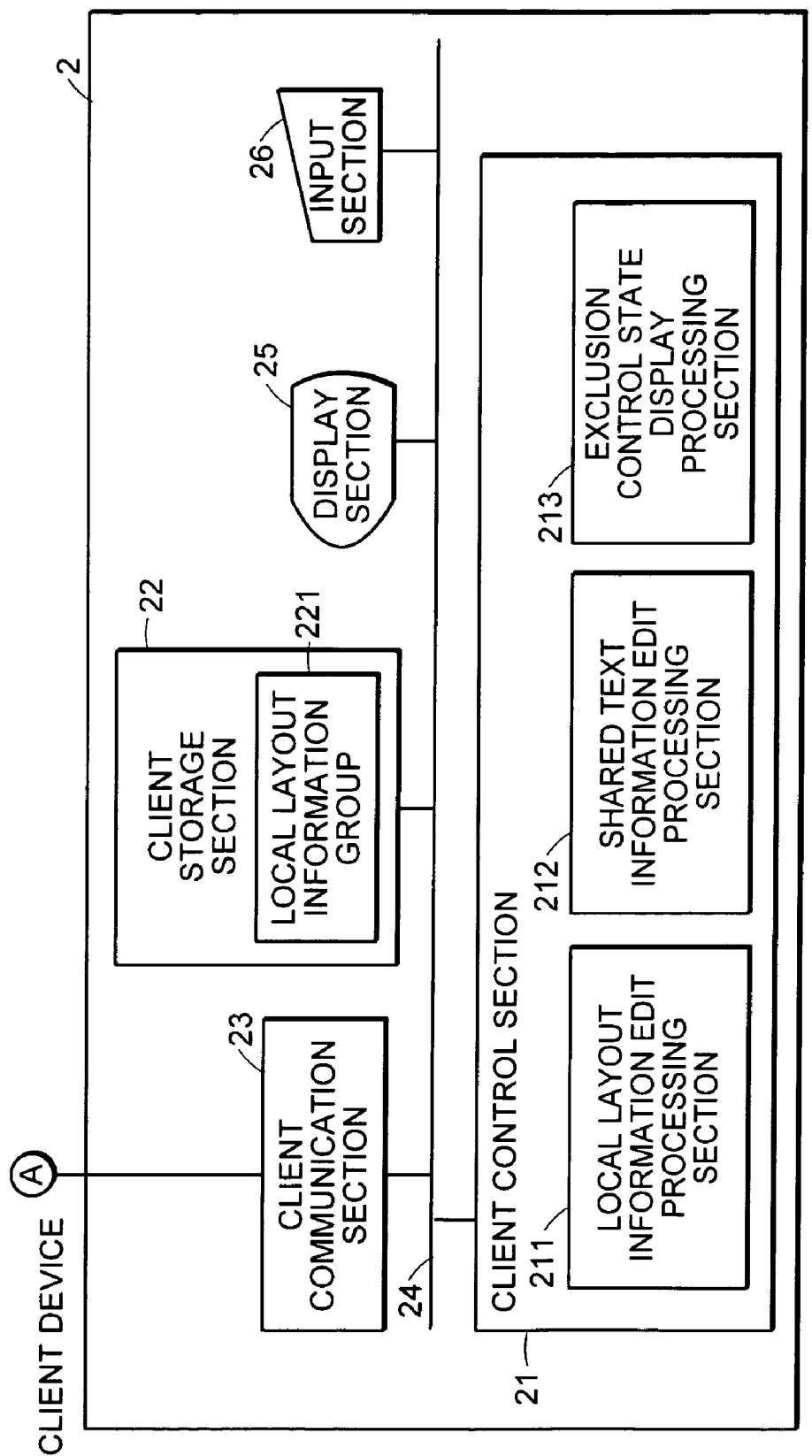
FIG. 1 is a diagram illustrating a schematic configuration of an information processing system X which is one of the information processing systems in accordance with the present invention.
Figure 1C:
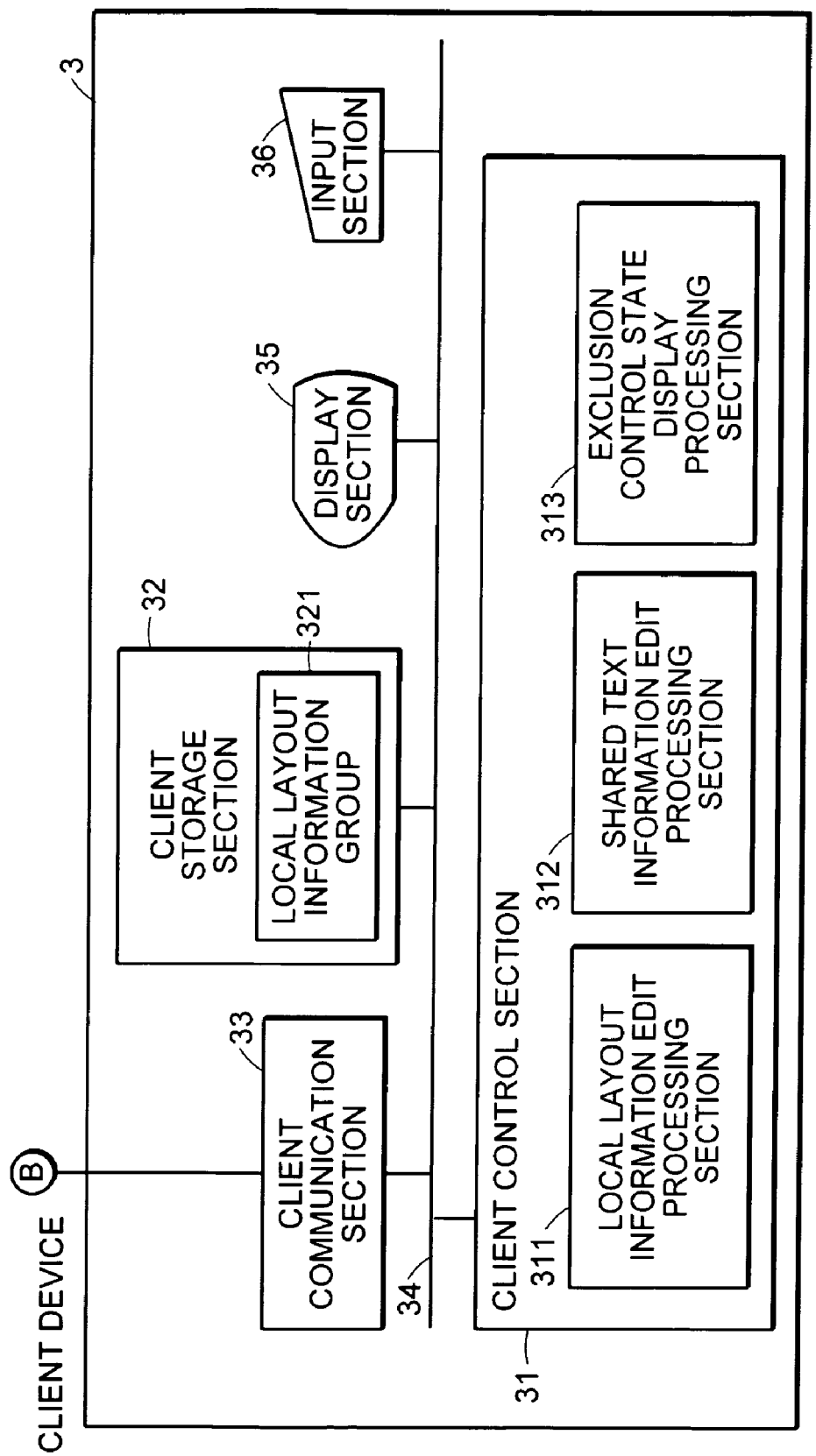
Figure 2A:
FIG. 2 is a diagram schematically illustrating one of information configurations of the information processing system X and display layouts.
Figure 2A:
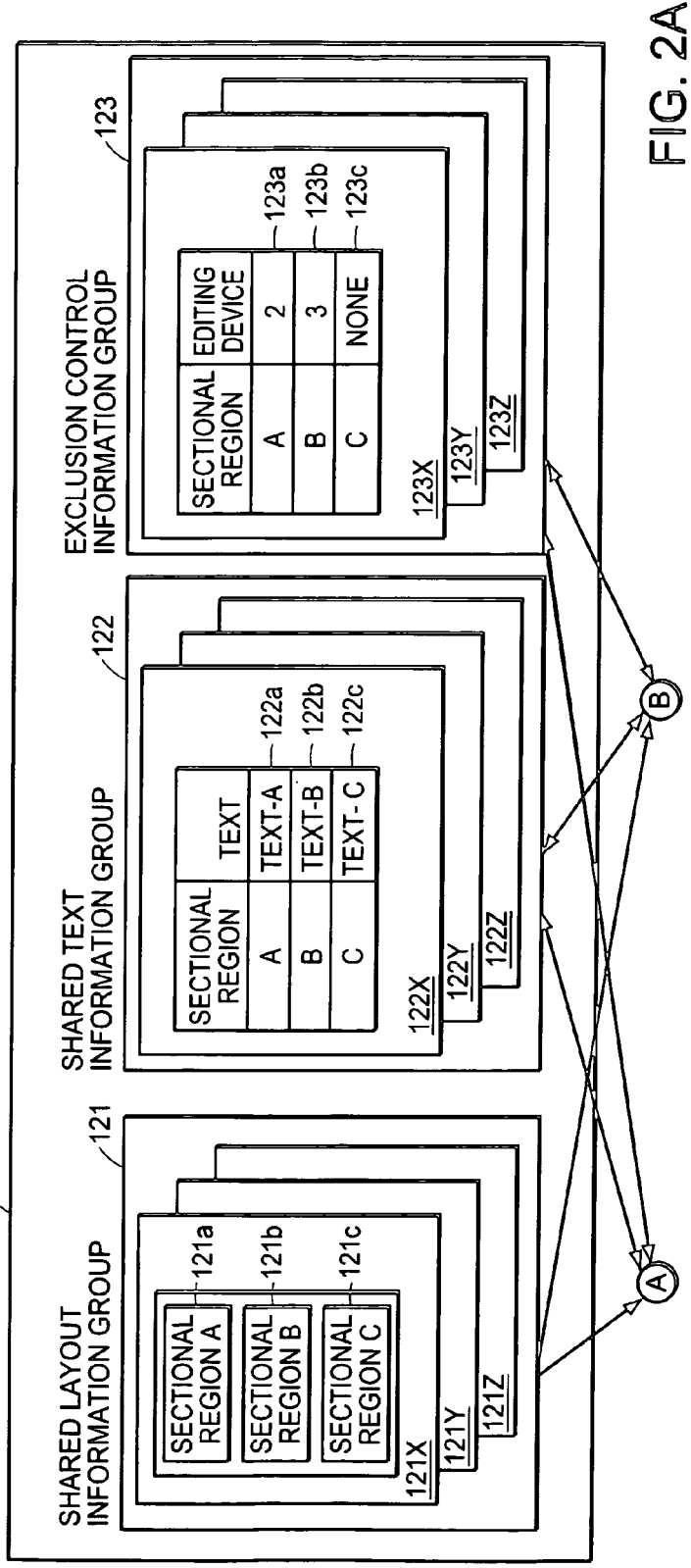
Figure 2B:
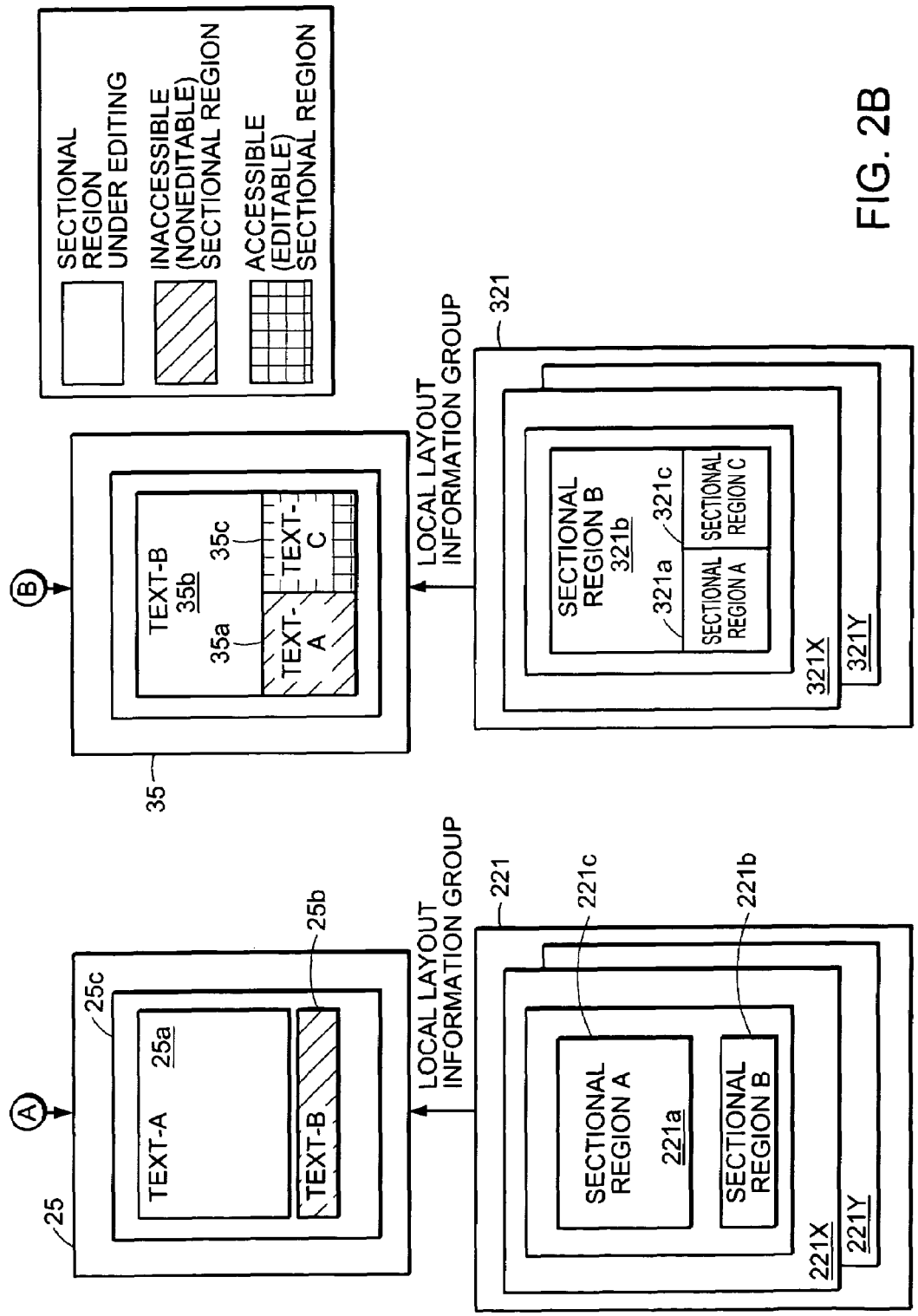
Figure 3:
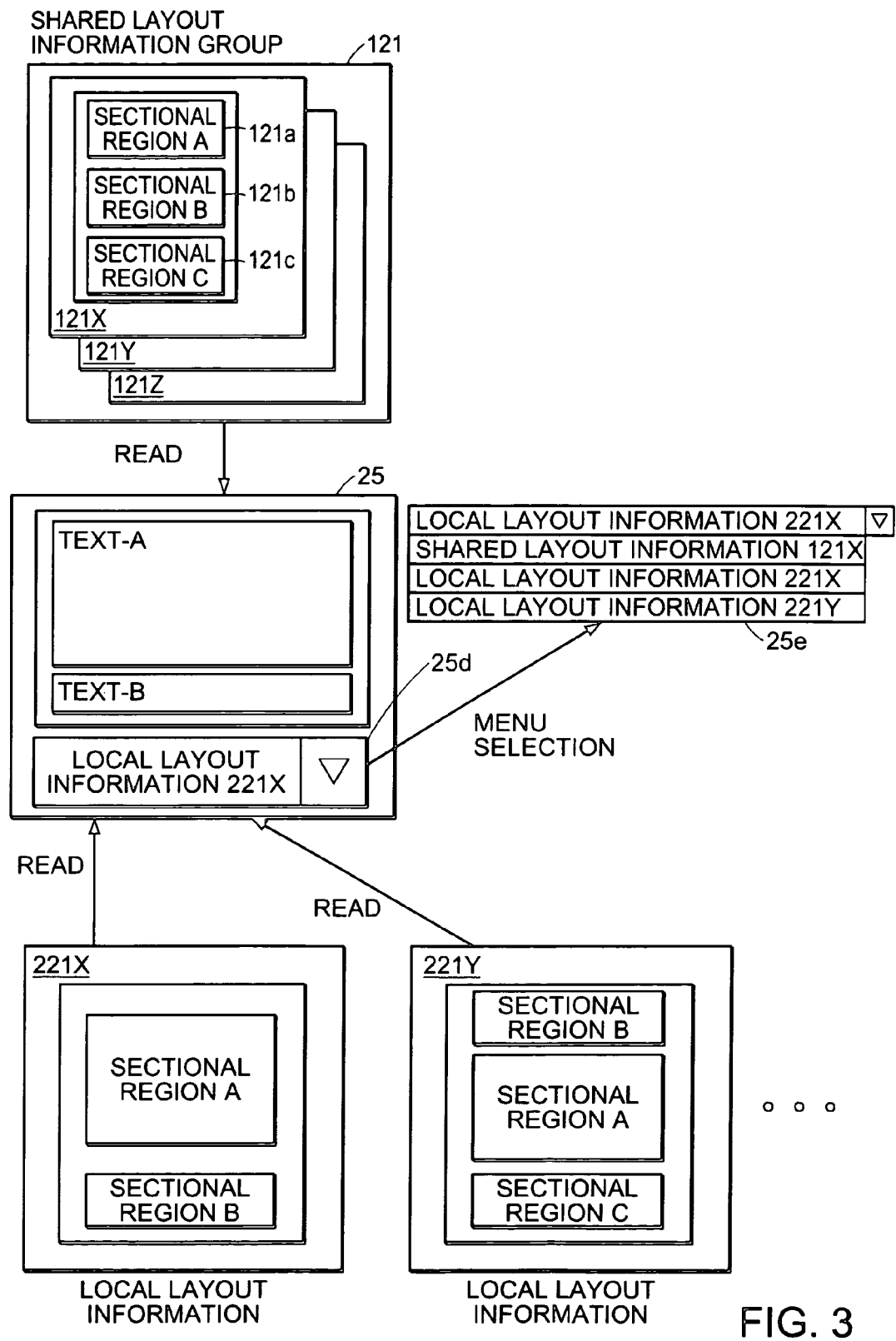
FIG. 3 is a diagram illustrating one of methods of selecting the display layouts.
Figure 4:
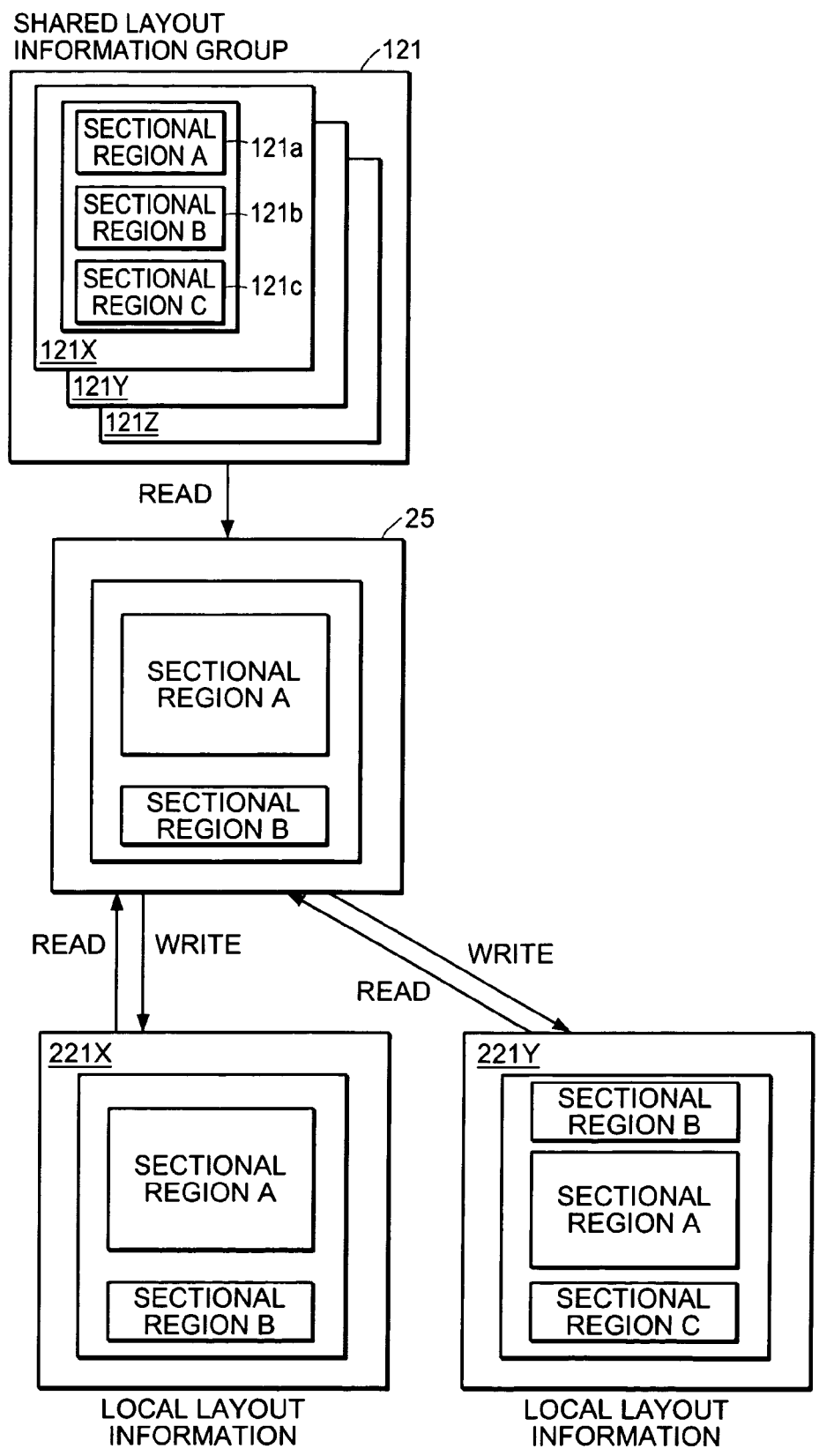
FIG. 4 is a diagram illustrating one of methods of editing local layout information.
Figure 5:
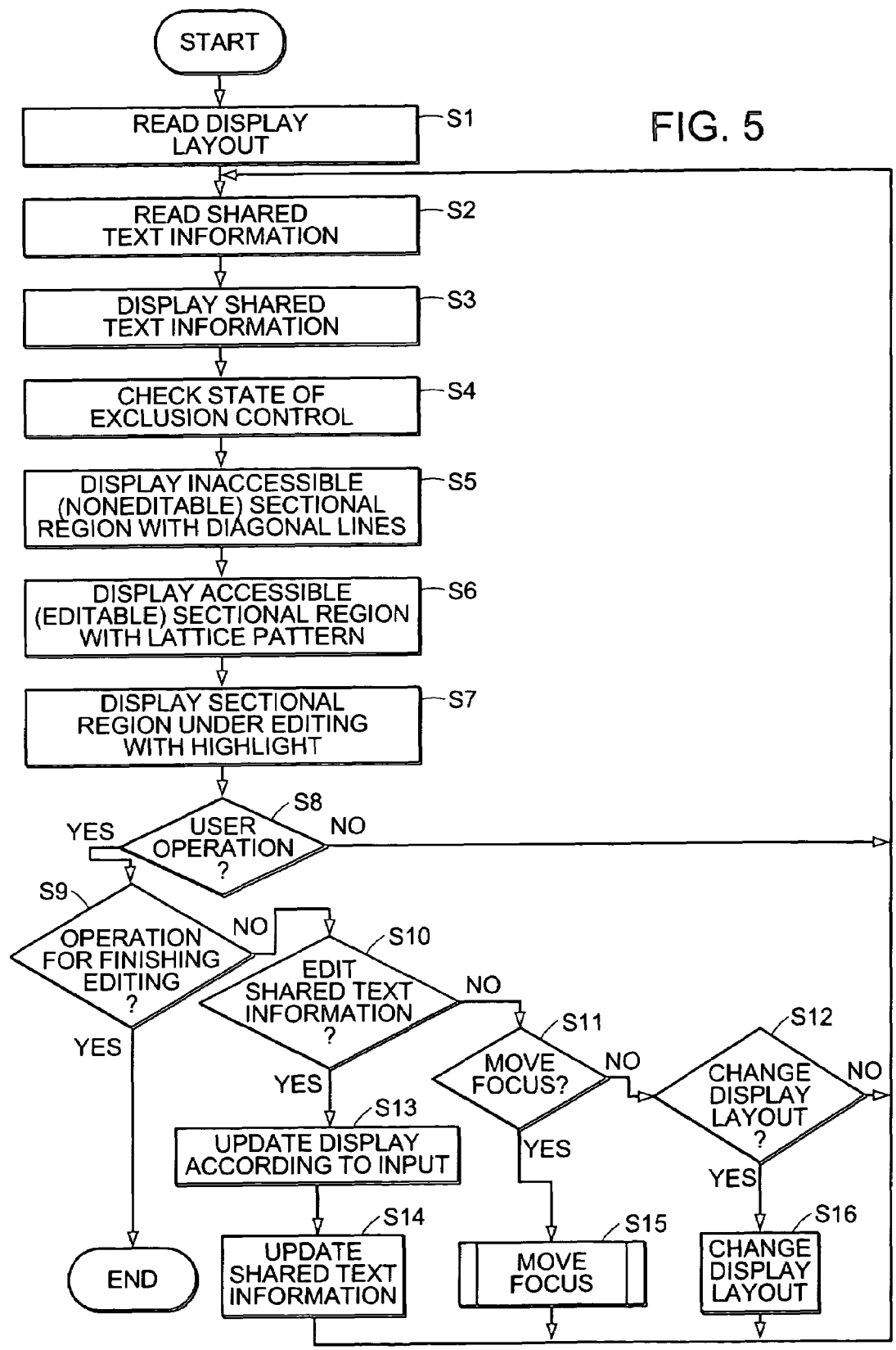
FIG. 5 is a flow chart illustrating a procedure of an editing work carried out by the information processing system X.
Figure 6:
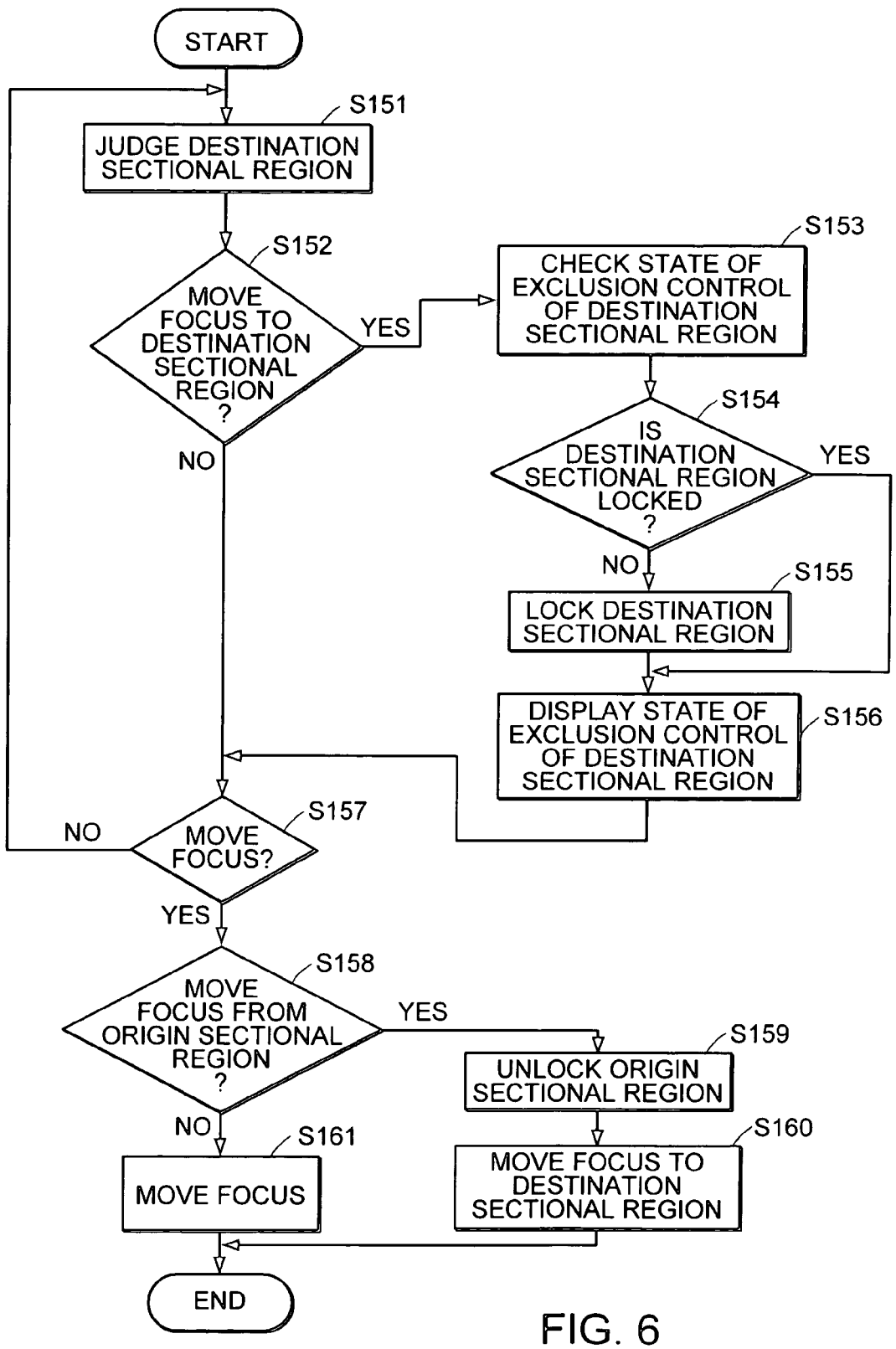
FIG. 6 is a flow chart illustrating one of processes of moving a focus (S15).

FIG. 1 is a diagram illustrating a schematic configuration of an information processing system X, which is one of the information processing systems in accordance with the present invention. FIG. 2 is a diagram schematically illustrating one of information configurations of the information processing system X and display layouts. FIG. 3 is a diagram illustrating one of methods of selecting the display layouts. FIG. 4 is a diagram illustrating one of methods of editing local layout information. FIG. 5 is a flow chart illustrating a procedure of editing in the information processing system X. FIG. 6 is a flow chart illustrating one of processes of moving a focus (S15).

The same reference numerals are used for the members having the same functions, and further explanations thereof are omitted.

As illustrated in FIG. 1, the information processing system X mainly includes a server device (first information processing terminal) 1 and client devices (second information processing terminal) 2, 3, . . . . The server device 1 and the client devices 2, 3, . . . are connected to a communication network 4 via the Internet network, LAN, or the like, so that the server device 1 and the client devices 2, 3, . . . can communicate with each other. The communication network 4 is realized by using communication interfaces, such as USBs, parallel cables, serial cables, or wireless devices. The communication interfaces, however, may be any means as long as transmission and reception of data is possible with the means.

The following mainly explains a process of editing carried out by the client device 2, but the other client devices carry out this process in the same way. In addition, in the present embodiment, explanations are made by using a text format file as a shared file, however the present invention is not limited to this, and the present invention is also applicable to other formats.

The server device 1 includes a server storage section (storage section) 12, a server communication section 13 and a server control section (exclusion control processing section) 11, and these sections are connected with each other via an internal connection bus 14.

The server storage section 12 is a storage device, such as a hard disc, a RAM, or the like storage device. The server storage section 12 includes a storage area for storing (i) a shared text information group 122 (shared file) having a plurality of sectional regions, (ii) a shared layout information group 121 for managing basic information of the display layouts for the sectional regions and (iii) an exclusion control information group 123 for managing exclusion control with respect to the sectional region on the regional basis.

The server communication section 13 is a communication device for establishing connection to the communication network 4 and may be a communication adapter, an optical communication adapter or the like adapter, which complies with IEEE802.3.

The server control section 11 is a logical circuit device, such as a CPU or an ASIC. The server control section 11 executes, for example, a program which causes the server device 1 to carry out a certain process. Moreover, the server control section 11 manages the exclusion control information group 123 so as to carry out the exclusion control with respect to the sectional regions on the regional basis in each shared text information included in the shared text information group 122 (see BACKGROUND OF THE INVENTION).

The internal connection bus 14 is an interface for realizing internal connections of the server device 1, and may be, for example, a PCI bus, an ATAPI, or the like device.

Meanwhile, the client device 2 (3) includes (i) a client storage section 22 (32), (ii) a display section 25 (35), (iii) an input section 26 (36), (iv) a client communication section 23 (33) and (v) a client control section 21 (31), and these sections are connected with each other via an internal connection bus 24 (34).

The client storage section 22 (32) is a storage device, such as a hard disc, a RAM, or the like. The client storage section 22 (32) includes a storage area for storing a local layout information group 221 (321). In addition to the shared layout information group 121 stored in the server storage section 12, the local layout information group (221, 321) is provided for each client device and is for managing the display layouts for the sectional regions of the shared text information included in the shared text information group 122. In the present embodiment, the local layout information group 221 (321) is stored in the client storage section 22 (32) of the client device 2 (3). However, as long as the local layout information group 221 (321) is accessible by the client device 2 (3), the the local layout information group 221 (321) may be stored in the server 1 or may be stored in another place.

The display section 25 (35) is a display output device (e.g., a display monitor) for displaying various information. The input section 26 (36) is an input device, such as a keyboard, a mouse, or the like device.

The client control section 21 (31) is a logical circuit device. Typical examples of the logical circuit device are: a CPU, an ASIC, or other logical device. The client control section 21 (31) includes (i) a local layout information edit processing section 211 (311), (ii) a shared text information edit processing section (display layout control section) 212 (312) and (iii) an exclusion control state display processing section 213 (313). The client control section 21 (31) executes, for example, a program which causes the client device 2 (3) to carry out a certain process.

The local layout information edit processing section 211 (311) causes the display section 25 (35) to display the shared layout information group 121 or the local layout information group 221 (321) stored in the client storage section 22 (32), so as to edit the shared layout information group 121 or the local layout information group 221 (321) in accordance with operational input (i.e. input regarding operation) received by the input section 26 (36).

The shared text information edit processing section 212 (312) causes the display section 25 (35) to display shared text information 122X, 122Y, . . . included in the shared text information group 122 stored in the server storage section 12, so as to edit the shared text information 122X, 122Y, . . . in accordance with the operational input received by the input section 26 (36). Generally, graphical user interfaces or the like are used for the local layout information edit processing section 211 (311) and the shared text information edit processing section 212 (312).

The exclusion control state display processing section (exclusion control state display section) 212 (313) looks up the exclusion control information group 123 stored in the server storage section 12, so as to cause the display section 25 (35) to display, on the regional basis, the state of the exclusion control in the shared text information 122X, 122Y, . . . included in the shared text information group 122.

As illustrated in the upper portion of FIG. 2, the shared text information group 122 includes the shared text information 122X, 122Y, 122Z, . . . , the shared layout information group 121 includes shared layout information 121X, 121Y, 121Z, . . . and the exclusion control information group 123 includes exclusion control information 123X, 123Y, 123Z, . . . .

The shared text information 122X includes sectional regions A, B and C. Here, text contents "Text-A", "Text-B" and "Text-C" (text management tables 122a, 122b, and 122c), are allotted to the sectional regions A, B and C, respectively.

The shared layout information 121X manages basic display layouts of the shared text information 122X. The basic display layouts are used for displaying the sectional regions of the shared text information 122X as indicated by the text management tables 122a, 122b and 122c, respectively. The wording "display layout" denotes a collection of visual information concerning, for example, where each sectional region (A, B, C) of the shared text information 122X positions and how big each sectional region (A, B, C) is when displaying the shared text information 122X on the display section 25 (35).

The exclusion control information 123X manages, on the regional basis, the state of the exclusion control with respect to the sectional region (A, B, C) in the shared text information 122X (exclusive management tables 123a, 123b and 123c).

The shared text information 122Y, 122Z, . . . , the shared layout information 121Y, 121Z, . . . and the exclusion control information 123Y, 123Z, . . . are arranged in the same way as above correspondingly.

As illustrated in the lower stage of FIG. 2, the local layout information group 221 includes local layout information 221X, 221Y, . . . . The local layout information 221X includes a display layout 221c in which the sectional regions A and B are positioned at positions 221a and 221b, respectively. The local layout information 221Y is indicative of a display layout different from that of the local layout information 221X.

In reference to FIGS. 2 to 4, the following schematically explains operations of the client device 2 by taking as an example an editing work carried out with respect to the shared text information 122X by the client device 2. After that, each step of the editing work is explained in reference to the flow charts of FIGS. 5 and 6.

When starting the editing of the shared text information 122X, the client control section 21 for controlling the client device 2 having been activated by a user activates the shared text information edit processing section 212 and the exclusion control state display processing section 213. The shared text information edit processing section 212 thus started up selects either of the local layout information 221X, 221Y, . . . included in the local layout information group 221 and read the selected local layout information in advance. Here, the shared text information edit processing section 212 may read the layout information having been selected in advance by the user, instead of the local layout information the local layout information group 221 have selected. Next, the shared text information edit processing section 212 reads the shared text information 122X. Then, the shared text information edit processing section 212 causes the display section 25 to display the sectional regions (A, B, and C) of the shared text information 122X according to the local layout information (221X, 221Y, . . . ) having been read.

As illustrated in FIG. 2, for example, in the case in which the shared text information edit processing section 212 reads the local layout information 221X, the shared text information edit processing section 212 places the sectional regions A and B of the shared text information 122X at positions 25a and 25b, respectively, according to the display layout 221c of the local layout information 221X. The positions 25a and 25b correspond to the positions 221*a* and 221*b*, respectively. Then, the shared text information edit processing section 212 causes the display section 25 to display the text contents "Text-A" and "Text-B" at the positions 25*a* and 25*b* of the display section 25, respectively (see the middle portion of FIG. 2). The text contents "Text-A" and "Text-B" correspond to the sectional region A of the text management table 122*a* of the shared text information 122X and the sectional region B of the text management table 122*b* of the shared text information 122X, respectively. Similarly, in the client device 3, the shared text information edit processing section 312 reads a local layout information 321X in advance so as to cause the display section 35 to display "Text-A" of the sectional region A, "Text-B" of the sectional region B and "Text-C" of the sectional region C at positions 35*a*, 35*b* and 35*c*, respectively (see the middle portion of FIG. 2). The local layout information 321X includes positions 321*a*, 321*b*, and 321*c* for placing the sectional regions A, B, and C, respectively.

Moreover, during the editing work of the shared text information 122X, the shared text information edit processing section 212 can select any of the display layouts and cause the display layout of the editing work to switch to the selected display layout. With this, the user can perform the editing work with the display layout that is appropriately changeable according to the progress of the editing work.

FIG. 3 illustrates one of methods of selecting the display layout by the shared text information edit processing section 212. As illustrated in FIG. 3, the shared text information edit processing section 212 causes the display section 25 to display a name of the display layout that is currently in use, and a pull-down menu button 25*d*. Then, the shared text information edit processing section 212 updates the display on the display section 25 according to the selected display layout in accordance with an operational input regarding selection, the operational input received by the pull-down menu button 25*b*.

In lieu to the pull-down menu button, a radio button, an icon, or inputting a layout name may be used for selecting the display layout. Moreover, the shared text information edit processing section 212 may be so arranged as to automatically switch to an appropriate display layout selected according to the sectional region which is being edited by the user.

Therefore, the user can edit the sectional regions (A, B, C) of the shared text information 122X while displaying the shared text information 122X with the display layout (local layout information group 221) having been determined in advance by himself, or by the client device 2 according to an object of the editing. As a result, efficiency of the editing work is improved.

Furthermore, in the case in which the shared text information 122X has a relevant sectional region relevant to any of the sectional regions A, B and C, the shared text information edit processing section 212 can cause the display section 25 to display the relevant sectional region with the desired display layout, just like the sectional regions A, B and C.

The exclusion control state display processing section 213 thus activated causes the display section 25 to display the state of the exclusion control with respect to the sectional regions in the shared text information 122X during the editing of the shared text information 122X.

For example, as illustrated in the middle stage of FIG. 2, the exclusion control state display processing section 213 causes the state of the exclusion control to be displayed as follows: the sectional region A under editing (position 25*a*) is displayed with highlight; an inaccessible (noneditable) sectional region (position 25*b*) is displayed with diagonal lines; and an accessible (editable) sectional region is displayed with a lattice pattern (The accessible (editable) sectional region is not illustrated because there are no accessible (editable) sectional region in the client device 2. In the client device 3, the accessible (editable) sectional region is the position 35*c*). In this case, the states of the exclusion controls with respect to the sectional regions may be distinguished by changing display colors, background patterns, contrasts, or the like. However, the method of distinguishing the states is not limited to this, and any methods can be used as long as the states can be distinguished. Moreover, the exclusion control state display processing section 213 may cause the display of the state of the exclusion control to be automatically updated according to the change in the state of the exclusion control or to be updated according to user inquiries.

Therefore, while editing a certain sectional region, the user can easily refer to the state of the exclusion control with respect to the other sectional region(s).

As described above, the local layout information edit processing section 211 can edit the display layouts. When starting the editing of the local layout information group 221, the client control section 21 activates the local layout information edit processing section 211. For example, as illustrated in FIG. 4, the local layout information edit processing section 211 thus activated reads the shared layout information 121X so as to cause the display section 25 to display the shared layout information 121X. Then, the display layout is changed in accordance with the operational input received by the input section 26 (see the middle portion of FIG. 4), and the display layout thus changed is stored in the local layout information group 221 of the client storage section 22 as the local layout information 221X, 221Y, . . . . In lieu of the local layout information 221X, 221Y, . . . thus prepared, the editing may be performed by reading out and using the local layout information 221X, 221Y, . . . having been stored in the client storage section 22 in advance.

By storing a plurality of display layouts (as the local layout information 221X, 221Y, . . . ) edited in the above way, users can selectively use the display layout according to each use or editing purpose.

In reference to the flow charts of FIGS. 5 and 6, the following explains the procedure of the editing carried out by the client device 2 in the information processing system X. For ease of explanation, the following discusses the editing work of the shared text information 122X. In the following description, S1, S2, and the like are reference numerals for indicating processes (steps) of the procedure of the editing. Moreover, the process illustrated in FIGS. 5 and 6 are carried out by causing the client control section 21 of the client device 2 to execute a file concurrent editing program having been stored in advance in the client storage section 22 or the like storage means.

As illustrated in FIG. 5, the shared text edit processing section 212 having been activated by the client control section 21 in order to start the editing of the shared text information 122X reads a display layout so that the display layout is determined in advance (S1). The display layout is (i) any of the local layout information 221X, 221Y, . . . included in the local layout information group 221 stored in the client storage section 22 of the client device 2 or (ii) the shared layout information 121X stored in the server storage section 12 of the server device 1.

Next, the shared text information edit processing section 212 reads the shared text information 122X from the server storage section 12 of the server device 1 (S2). Then, the shared text information edit processing section 212 causes the display section 25 to display the sectional regions (A, B, and C) of the shared text information 122X according to the display layout read in S1 (S3).

Next, the exclusion control state display processing section 213 looks up the exclusion control information 123X stored in the server storage section 12 of the server device 1, and checks the state of the regional-basis exclusion control with respect to the sectional regions in the shred text information 122X (S4). Then, the display section 25 displays the state. In the present embodiment, as illustrated in the middle stage of FIG. 2, the exclusion control state display processing section 213 causes the accessible (editable) sectional region to be displayed with the lattice pattern (S5), the inaccessible (non-editable) sectional region is displayed with the diagonal lines (S6), and the sectional region under editing is displayed with the highlight (S7).

Then, the shared text information edit processing section 212 stands by until the user carries out an operation (S8). In the case in which no operation is carried out (No in S8), the shared text information edit processing section 212 looks up the shared text information 122X and the exclusion control information 123X on an as-needed basis so as to update the display of the display section 25 (S2 to S7). In the case in which the operation is carried out, the process proceeds to S9. Moreover, in the case in which the shared text information edit processing section 212 accepts the operation of finishing the editing, the shared text information edit processing section 212 causes the present editing work to be finished (Yes in S9). In the case in which the shared text information edit processing section 212 accepts the other operation, the process proceeds to S10.

In the case of accepting the operation of editing the shared text information 122X (Yes in S10), the shared text information edit processing section 212 updates the display of the display section 25 according to the above operation (S13) and updates the shared text information 122X (S14). In the case of accepting the operation of moving a focus (Yes in S11) (note that, the focus is a position where the editing is carried out, such as a cursor or a mouse pointer), the shared text information edit processing section 212 carries out the following process illustrated in FIG. 6 in order to move the focus. In the case of accepting the operation of changing the display layout (Yes in S12), the shared text information edit processing section 212 changes the display layout (S16), and the shared text information 122X is displayed according to the display layout thus changed (S2 to S7).

Here, in the case in which the exclusion control information group 123 is changed by the operation carried out by the other client device(s), the exclusion control state display processing section 213 may carry out an interrupt process in which the display of the display section 25 is updated.

The following explains S15 that is carried out by the shared text information edit processing section 212.

As illustrated in FIG. 6, the shared text information edit processing section 212 finds a position to which the focus will be moved (S151). If the position is in the sectional region under editing, the process proceeds to S157. If not, the process proceeds to S153. In S153, the state of the exclusion control with respect to the sectional region to which the focus will be moved is checked. If the sectional region is in an inaccessible (noneditable) state (locked) (Yes in S154), the process proceeds to S156. If the sectional region is in an accessible (editable) state (unlocked) (No in S154), the process proceeds to S155. In S155, the shared text information edit processing section 212 rewrites the exclusion control information 123X that corresponds to the sectional region to which the focus will be moved, so as to prohibit (lock) the access (editing) of the other users. In S156, the state of the exclusion control with respect to the sectional region to which the focus will be moved is displayed so that the other users are notified (S156), and the process proceeds to S157. Incidentally, in S156, any of the following processes may be carried out according to the display of the state of the exclusion control, such as a process of canceling the moving of the focus, a process of searching an unlocked sectional region, a process of displaying (notifying) a request of a negotiation to the other user who is locking the subject sectional region, a process of standing by (waiting) until the subject sectional region is unlocked, a process of requesting the user to select what step to take next, and the like.

In S157, the shared text information edit processing section 212 stands by until the moving of the focus is determined. If the moving of the focus is determined, the process proceeds to S158. If not, the process returns to S151 and the shared text information edit processing section 212 keeps on monitoring the sectional regions to which the focus can be moved. Then, in the case in which the focus moves from the sectional region where the focus is originally located (Yes in S158), the sectional region is unlocked (S159), and the moving of the focus to the other sectional region is decided and carried out (S160). In the case in which the focus does not move from the sectional region where the focus is originally located (No in S158), the moving of the focus within the sectional region is decided and carried out (S161).

In S15, (i) by detecting the position to which the focus will be moved, which sectional region will be edited next is predicted, and then (ii) the exclusion control is carried out in advance with respect to the sectional region thus predicted. However, the present invention is not limited to this, but which sectional region will be edited next may be predicted, according to process states, based on a procedure determined in advance, or any methods may be used as long as which sectional region will be edited next can be predicted.

The shared layout information 121X, 121Y, 121Z, . . . may include data indicative of numbers or names for identifying the shared layout information 121X, 121Y, 121Z, . . . from each other. Concretely, as illustrated in FIG. 9, the shared layout information may include data indicative of a shared layout number and a shared layout name. Here, shared layout numbers are identification numbers given to the respective shared layouts, and the shared layout names are names corresponding to the respective shared layout numbers.

Moreover, the local layout information 221X, 221Y, 221Z . . . may include data for identifying the local layout information 221X, 221Y, 221Z, . . . and/or data concerning positions of the sectional regions. Concretely, as illustrated in FIG. 10, the local layout information may include data concerning a local layout number, a sectional region name, a region starting position K, a region starting position J, a region width I and a region height H, and/or the like information.

Local layout numbers are identification numbers given to the respective local layouts, and is associated with the shared layout number. Moreover, sectional region names are identification references given to the respective sectional regions included in a layout. The sectional region names correspond to the respective local layout numbers. Further, the region starting position K, the region starting position J, the region width I and the region height H indicate data for determining the position and dimension of a sectional region on a text.

Figure 11:
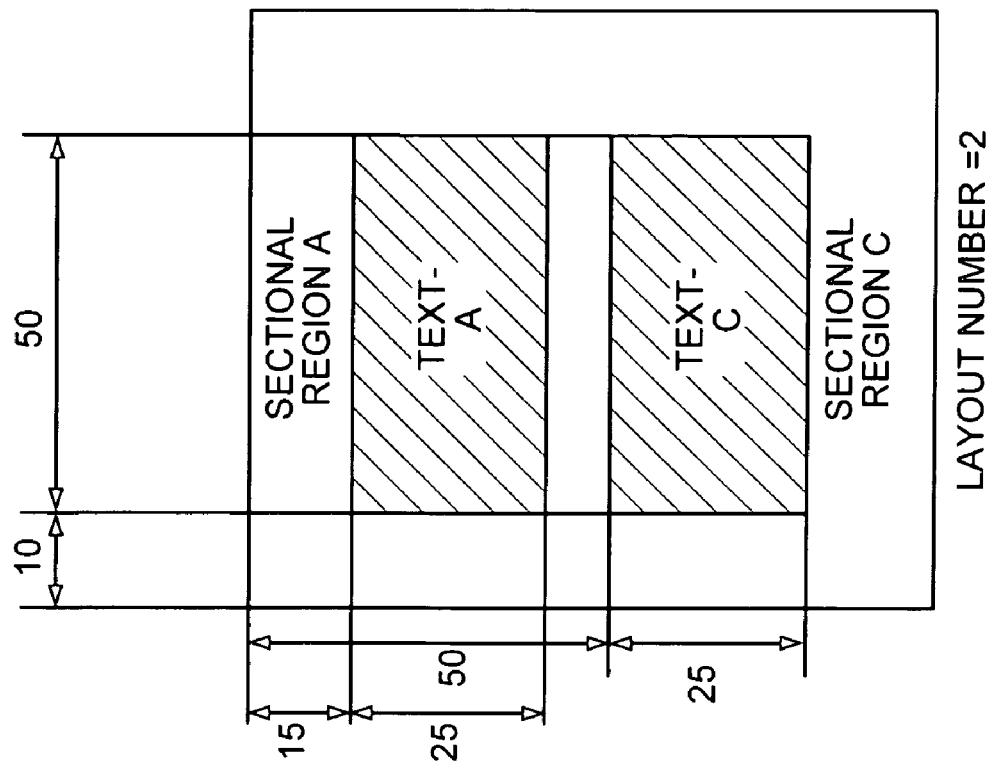
FIG. 11 is a diagram illustrating a layout displayed based on the local layout information illustrated in FIG. 10.
Figure 11:
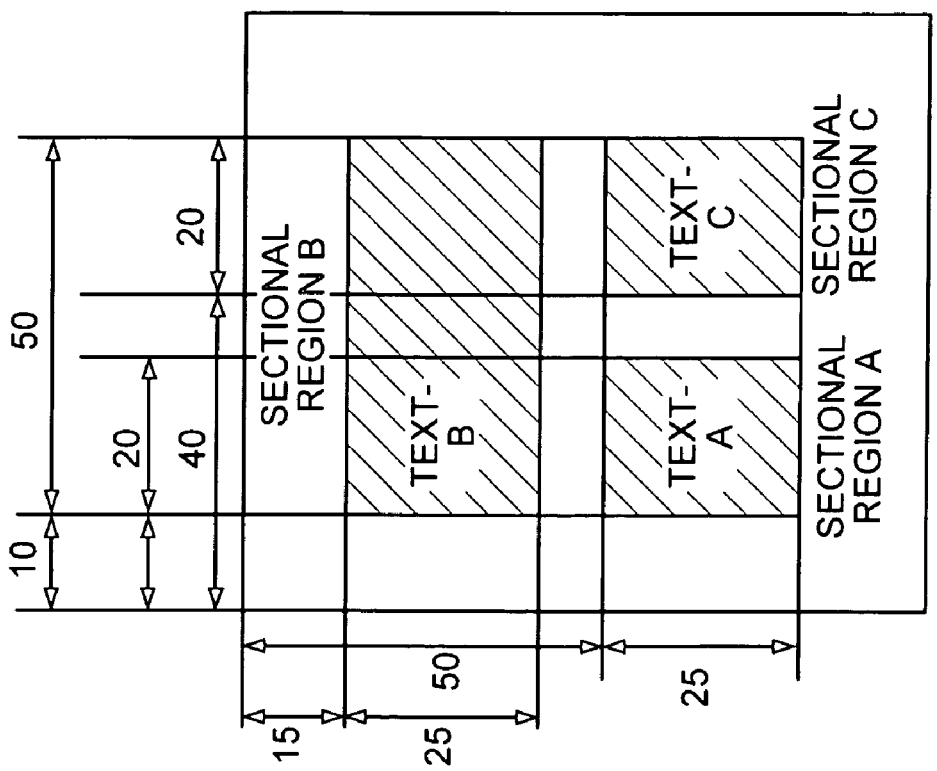

FIG. 11 illustrates layouts obtained in the case in which the shared layout information has the data shown in FIG. 9 and the local layout information has the data shown in FIG. 10.

Because the local layout number is associated with the shared layout number, the server device needs only to have one shared layout information, and a user can carry out the editing with the desired display layout by just selecting the local layout number. Moreover, because the client devices have the local layout information different from each other, it is possible to carry out the editing with the desired display layout according to each user.

Embodiment 2

Figure 7:
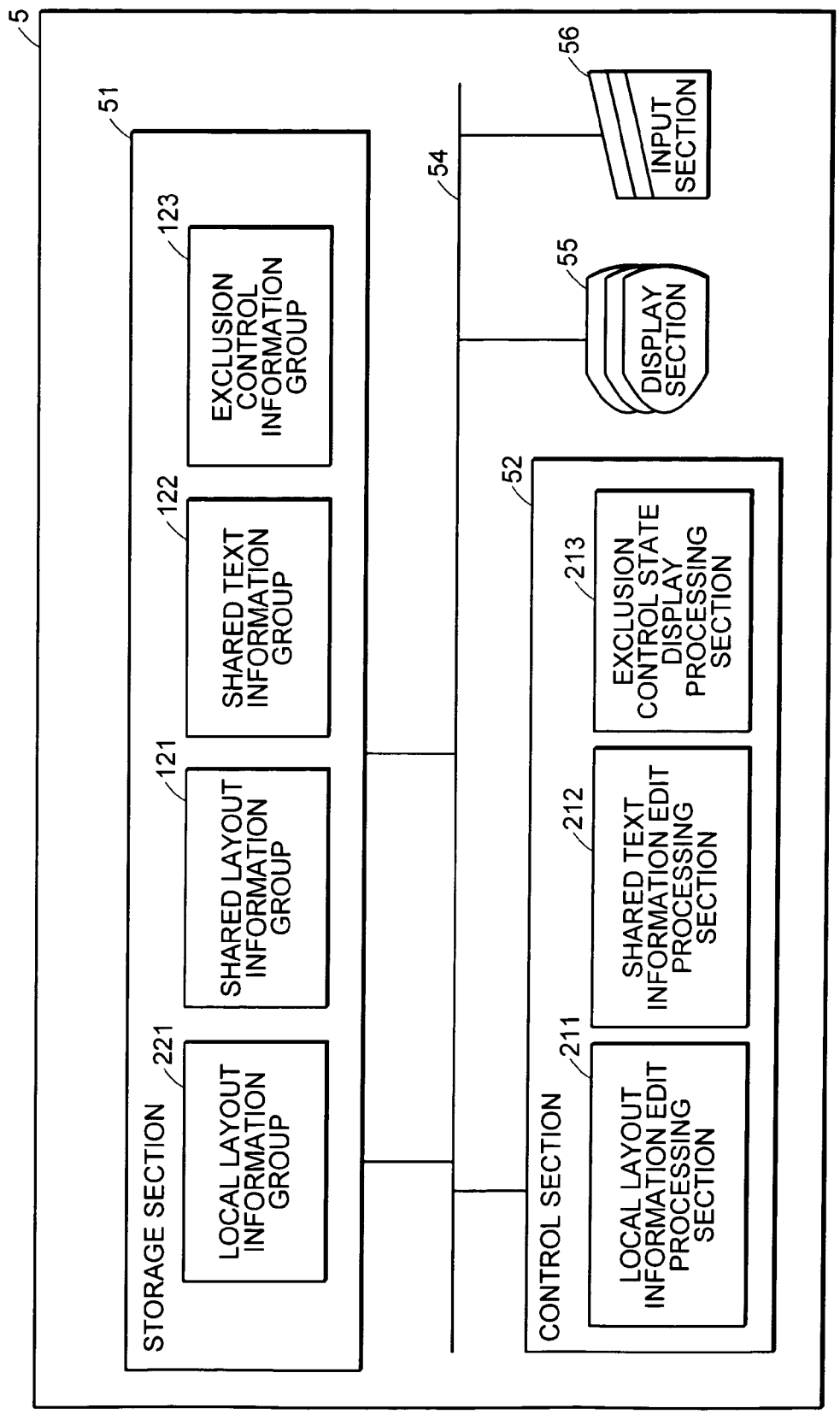
FIG. 7 is a diagram illustrating a schematic configuration of an information processor 5 in accordance with the present invention.
Figure 8:
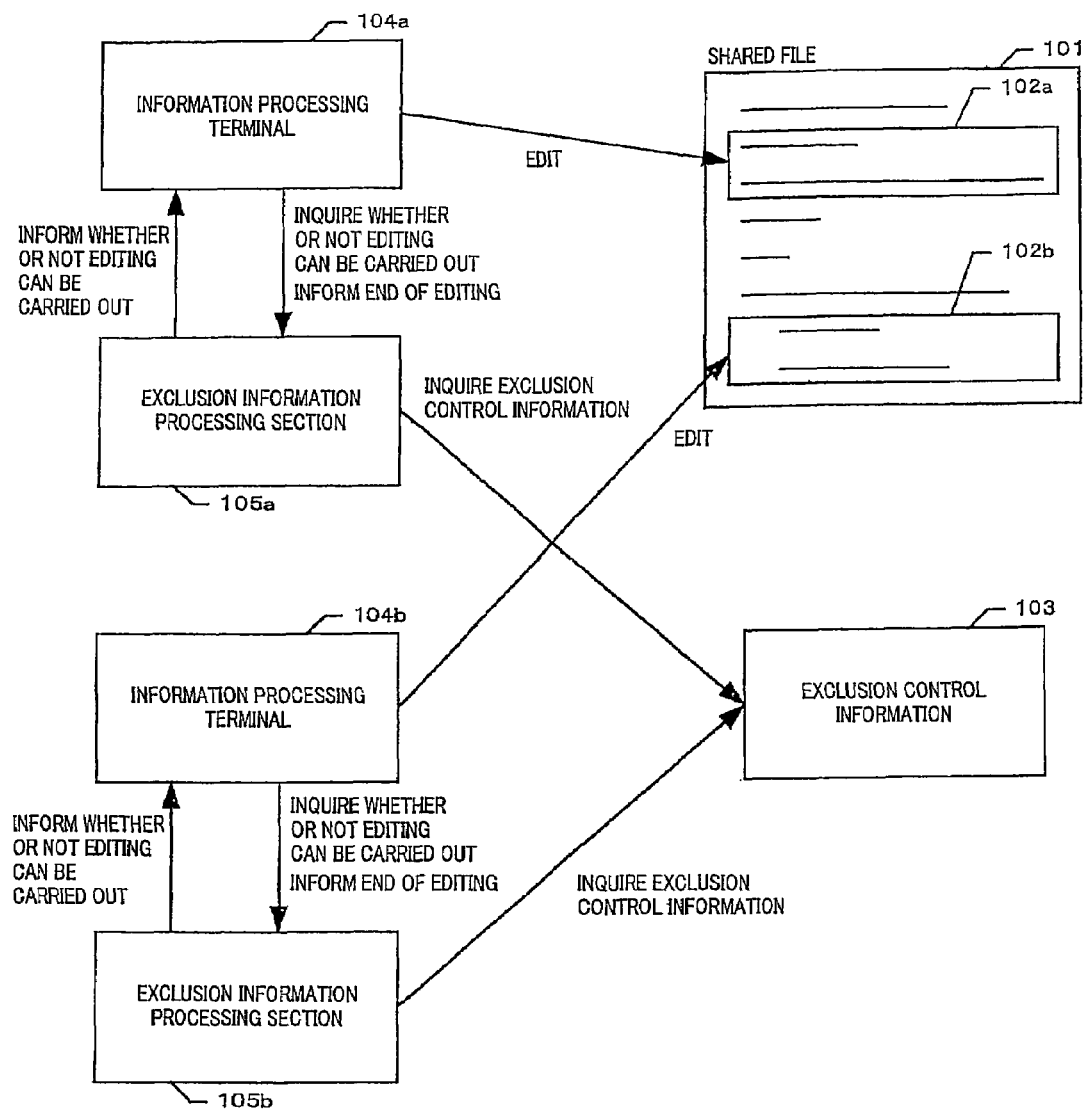
FIG. 8 is a diagram illustrating a conventional technique of carrying out exclusion control with respect to each sectional region so as to concurrently edit the sectional regions.

Referring to FIG. 7, the following explains Embodiment 2 different from Embodiment 1.

FIG. 7 is a diagram illustrating a schematic configuration of an information processor 5 in accordance with the present invention. The same reference numerals are used for the members having the same functions as the members used in Embodiment 1, and further explanations thereof are omitted.

As illustrated in FIG. 7, the information processor 5 includes a storage section 51, a control section 52, a plurality of display sections 55 and a plurality of input sections 56, and these sections are connected with each other via an internal connection bus 54.

The storage section 51 stores a local layout information group 221, a shared layout information group 121, a shared text information group 122, and an exclusion control information group 123. The control section 52 includes the local layout information edit processing section 211, the shared text information edit processing section 212 and the exclusion control state display processing section 213.

That is, the information processor 5 includes (i) major members of the server device 1 and the client device 2 of the information processing system X, (ii) a plurality of display sections 55 and (iii) a plurality of input sections 56. Therefore, the user can edit the sectional regions of the shared text information 122X, 122Y, ... with the display based on the appropriate display layout having been determined in advance according to editing purpose or according to each user individually as described above, the sectional regions of the shared text information 122X, 122Y, ... included in the shared text information group 122. On this account, it is possible to improve the operability and the efficiency of the editing works concurrently carried out for the shared text information 122X, 122Y, ....

As described above, an information processing system of the present invention comprises: (i) a first information processing terminal including (a) a storage section for storing a shared file having a plurality of sectional regions and (b) an exclusion control processing section for managing access to the sectional regions in the shared file so as to carry out exclusion control with respect to the sectional regions on a regional basis, in order to allow concurrent editing of the shared file; and (ii) at least one second information processing terminal (a) connected to the first information processing terminal communicably and (b) including a display layout control section for controlling a display section so as to cause the display section to display the shared file with a predetermined display layout, the display layout control section causing the display section to display the sectional regions according to a display layout determined in advance and selected for the at least one second information processing terminal individually.

Here, for example, the first information processing terminal and/or the at least one second information processing terminal may further comprise a display layout storage section for storing one or a plurality of display layouts, the display layout control section causing the display section to display the sectional regions according to one of the one or plurality of display layouts stored in the display layout storage section.

In this case, for example, the first information processing terminal and/or the second information processing terminal(s) may further include a display layout storage section for storing one or a plurality of display layouts.

Because a plurality of display layouts can be stored in this case, the same layout can be used as many times as required. Moreover, it is possible to selectively use the display layout selected from a plurality of display layouts stored as above. On this account, it is possible to enhance convenience.

Moreover, it is preferable that the information processing system further comprise a display layout switching section for switching from one display layout to another while editing the shared file.

With this, the user can carry out the editing work while switching the display layout according to, for example, purposes of the editing work. On this account, it is possible to further improve the operability and the efficiency of the editing works concurrently carried out for the shared file.

In this case, for example, the display layout switching section may automatically switch from one display layout to another according to which sectional region is being edited by a user.

With this, an appropriate display layout is automatically displayed according to editing positions, editing purposes, editing contents, and the like. On this account, it is possible to improve the operability and the efficiency of the editing work.

Further, the information processing system may further comprise a next process predicting section for predicting, according to a state of a process, a sectional region that will be processed next, and the exclusion control processing section may be able to carry out the exclusion control in advance with respect to the predicted sectional region.

With this, the exclusion control processing section carries out in advance the exclusion control with respect to the sectional region which will be edited next. On this account, it is possible to carry out the process smoothly.

Moreover, it is preferable that the information processing system further comprise an exclusion control state display section for displaying a state of the exclusion control according to a change in the exclusion control, the exclusion control carried out by the exclusion control processing section.

With this, it is possible to easily understand the state of the exclusion control with respect to the shared file. On this account, it is possible to further improve the efficiency of the editing work.

Further, it is preferable that the information processing system further comprise a display layout editing section for editing the display layout determined in advance or the display layouts stored in the display layout storage section.

With this, it is possible to design and edit an appropriate display layout according to editing purpose or according to each user individually. On this account, it is possible to enhance convenience.

Moreover, an information processor of the present invention may be so arranged as to be connected to a first information processing terminal communicably and comprise a display layout control section for controlling a display section so as to cause the display section to display, with a predetermined display layout, a shared file having a plurality of sectional regions, the first information processing terminal including (a) a storage section for storing the shared file and (b) an exclusion control processing section for managing access to the sectional regions in the shared file so as to carry out exclusion control with respect to the sectional regions on a regional basis, in order to allow concurrent editing of the shared file, the display layout control section causing the display section to display the sectional regions according to a display layout determined in advance and selected for the information processor individually.

Further, an information processor of the present invention may be so arranged as to comprise (a) a storage section for storing a shared file having a plurality of sectional regions, (b) an exclusion control processing section for managing access to the sectional regions in the shared file so as to carry out exclusion control with respect to the sectional regions on a regional basis, in order to allow concurrent editing of the shared file and (c) a display layout control section for controlling one or a plurality of display sections so as to cause the one or plurality of display sections to display the shared file with a predetermined display layout, the display layout control section causing the display section to display the sectional regions according to a display layout determined in advance and selected for the one or plurality of display sections individually.

Moreover, a file concurrent editing method of the present invention may comprise the step of: controlling a display section so as to cause the display section to display a shared file with a predetermined display layout, the shared file being stored in a first information processing terminal comprising (a) a storage section for storing a shared file having a plurality of sectional regions and (b) an exclusion control processing section for managing access to the sectional regions in the shared file so as to carry out exclusion control with respect to the sectional regions on a regional basis, in order to allow concurrent editing of the shared file, said step of controlling being carried out by at least one second information processing terminal connected to the first information processing terminal communicably, the step of controlling being performed in such a manner that the display section displays the sectional regions according to a display layout determined in advance and selected for the at least one second information processing terminal individually.

Further, a file concurrent editing program of the present invention may be so arranged as to cause at least one second information processing terminal to control a display section so as to display a shared file with a predetermined display layout, the at least one second information processing terminal connected to a first information processing terminal communicably, the shared file being stored in the first information processing terminal, the first information processing terminal comprising (a) a storage section for storing the shared file having a plurality of sectional regions and (b) an exclusion control processing section for managing access to the sectional regions in the shared file so as to carry out exclusion control with respect to the sectional regions on a regional basis, in order to allow concurrent editing of the shared file, the controlling being performed in such a manner that the display section displays the sectional regions according to a display layout determined in advance and selected for the at least one second information processing terminal individually.

The present invention is not limited to the embodiments above, but may be altered within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An information processing system comprising:
   (i) a first information processing terminal including (a) a storage section for storing a shared file having a plurality of sectional regions in one page and (b) an exclusion control processing section for managing access to the sectional regions in the shared file so as to carry out exclusion control with respect to the sectional regions on a regional basis, in order to allow concurrent editing of the shared file; and
   (ii) at least one second information processing terminal (a) connected to the first information processing terminal communicably and (b) including a display layout control section for controlling a display section so as to cause the display section to display display target page in the shared file with a predetermined display layout, a display layout storage section for storing at least one display layout, and an exclusion control state display processing section for causing each sectional region of the display target page in the shared file to be displayed in a display mode according to the state of the exclusion control carried out by the exclusion control processing section,
   each of the at least one display layout being designed such that with respect to each of the at least one second information processing terminal and according to each user or each object of editing, the display position and display size of a sectional region editable by a user of one of the at least one second information processing terminal and a sectional region uneditable by the user in individual pages of the shared file are determined in advance,
   the display layout control section causing the display section to display sectional regions in a display target page according to a display layout selected, by a user of one of the at least one second information processing terminal including that display layout control section, from the at least one display layout stored in the display layout storage section included in said one of the at least one second information processing terminal, the sectional regions being a sectional region editable by the user and a sectional region uneditable by the user.

2. The information processing system as set forth in claim 1, wherein the display layout control section further comprises a display layout editing section for editing the display layouts stored in the display layout storage section.

3. The information processing system as set forth in claim 1, wherein the display layout control section further comprises a display layout switching section for switching from one display layout to another while editing the shared file.

4. The information processing system as set forth in claim 3, wherein the display layout switching section automatically switches from the one display layout to the another according to which sectional region is being edited by a user.

5. The information processing system as set forth in claim 1, further comprising a next process predicting section for predicting, according to a state of a process, a sectional region that will be processed next,
   the exclusion control processing section being able to carry out the exclusion control in advance with respect to the predicted sectional region.

6. The information processing system as set forth in claim 1, wherein said exclusion control state display section displays the state of the exclusion control according to a change in the exclusion control.

7. The information processing system as set forth in claim 1, wherein the exclusion control processing section stores an exclusion control information group, which are information concerning the exclusion control with respect to the sectional regions on a regional basis.

8. The information processing system as set forth in claim 1, wherein the display layout control section further comprises a display layout editing section for editing the display layout determined in advance.

9. An information processor connected to a first information processing terminal communicably and comprising a display layout control section for controlling a display section so as to cause the display section to display a display target page, with a predetermined display layout, in a shared file having a plurality of sectional regions in one page, the first information processing terminal including (a) a storage section for storing the shared file and (b) an exclusion control processing section for managing access to the sectional regions in the shared file so as to carry out exclusion control with respect to the sectional regions on a regional basis, in order to allow concurrent editing of the shared file, the information processor further including a display layout storage section for storing at least one display layout, and an exclusion control state display processing section for causing each sectional region of the display target page in the shared file to be displayed in a display mode according to the state of the exclusion control carried out by the exclusion control processing section, each of the at least one display layout being designed such that with respect to each of the at least one second information processing terminal and according to each user or each object of editing, the display position and display size of a sectional region editable by a user of one of the at least one second information processing terminal and a sectional region uneditable by the user in individual pages of the shared file are determined in advance, the display layout control section causing the display section to display sectional regions in a display target page according to a display layout selected, by the user of the information processor including that display layout control section, from the at least one display layout stored in the display layout storage section included in the information processor, the sectional regions being a sectional region editable by the user and a sectional region uneditable by the user.

10. An information processor comprising (a) a storage section for storing a shared file having a plurality of sectional regions in one page, (b) an exclusion control processing section for managing access to the sectional regions in the shared file so as to carry out exclusion control with respect to the sectional regions on a regional basis, in order to allow concurrent editing of the shared file, (c) a display layout control section for controlling one or a plurality of display sections so as to cause the one or plurality of display sections to display a display target page in the shared file with one or plurality of predetermined display layouts, respectively, (d) a display layout storage section for storing at least one display layout and (e) an exclusion control state display processing section for causing each sectional region of the display target page in the shared file to be displayed in a display mode according to the state of the exclusion control carried out by the exclusion control processing section, each of the at least one display layout being designed such that with respect to each of the at least one second information processing terminal and according to each user or each object of editing, the display position and display size of a sectional region editable by a user of one of the at least one second information processing terminal and a sectional region uneditable by the user in individual pages of the shared file are determined in advance, the display layout control section causing the display section to display sectional regions in a display target page according to a display layout selected, by the user of the information processor including that display layout control section, from the at least one display layout stored in the display layout storage section included in the information processor, the sectional regions being a sectional region editable by the user and a sectional region uneditable by the user.

11. A method of concurrently editing a file, comprising the step of:

controlling a display section so as to cause the display section to display a shared file with a predetermined display layout, the shared file being stored in a first information processing terminal comprising (a) a storage section for storing a shared file having a plurality of sectional regions in one page and (b) an exclusion control processing section for managing access to the sectional regions in the shared file so as to carry out exclusion control with respect to the sectional regions on a regional basis, in order to allow concurrent editing of the shared file, said step of controlling being carried out by at least one second information processing terminal connected to the first information processing terminal communicably, the at least one second information processing terminal including a display layout storage section for storing at least one display layout, and an exclusion control state display processing section for causing each sectional region of the display target page in the shared file to be displayed in a display mode according to the state of the exclusion control carried out by the exclusion control processing section, each of the at least one display layout being designed such that with respect to each of the at least one second information processing terminal and according to each user or each object of editing, the display position and display size of a sectional region editable by a user of one of the at least one second information processing terminal and a sectional region uneditable by the user in individual pages of the shared file are determined in advance, said step of controlling being performed in such a manner that the display section displays sectional regions in a display target page according to a display layout selected, by a user of one of the at least one second information processing terminal including the display layout control section, from the at least one display layout stored in the display layout storage section included in said one of the at least one second information processing terminal, the sectional regions being a sectional region editable by the user and a sectional region uneditable by the user.

12. A computer-readable storage medium storing a program for concurrently editing a file, the program causing at least one second information processing terminal to control a display section so as to display a shared file with a predetermined display layout, the at least one second information processing terminal connected to a first information processing terminal communicably, the shared file being stored in the first information processing terminal, the first information processing terminal comprising (a) a storage section for storing the shared file having a plurality of sectional regions in one page and (b) an exclusion control processing section for managing access to the sectional regions in the shared file so as to carry out exclusion control with respect to the sectional regions on a regional basis, in order to allow concurrent editing of the shared file, the at least one second information processing terminal including a display layout storage section for storing at least one display layout, and an exclusion control state display processing section for causing each sectional region of the display target page in the shared file to be displayed in a display mode according to the state of the exclusion control carried out by the exclusion control processing section, each of the at least one display layout being designed such that with respect to each of the at least one second information processing terminal and according to each user or each object of editing, the display position and display size of a sectional region editable by a user of one of the at least one second information processing terminal and a sectional region uneditable by the user in individual pages of the shared file are determined in advance, the controlling being performed in such a manner that the display section displays sectional regions in a display target page according to a display layout selected, by a user of one of the at least one second information processing terminal including that display layout control section, from the at least one display layout stored in the display layout storage section included in said one of the at least one second information processing terminal, the sectional regions being a sectional region editable by the user and a sectional region uneditable by the user.

* * * * *